United States Patent [19]

Weiglein et al.

[11] Patent Number: 5,193,077

[45] Date of Patent: Mar. 9, 1993

[54] METHOD AND APPARATUS FOR IMPROVED SEISMIC PROSPECTING

[75] Inventors: Arthur B. Weiglein, Grapevine; Timothy H. Keho, Plano; Bruce G. Secrest, Houston, all of Tex.

[73] Assignees: Atlantic Richfield Company, Los Angeles, Calif.; BP Exploration Inc., Houston, Tex.

[21] Appl. No.: 593,518

[22] Filed: Oct. 2, 1990

Related U.S. Application Data

[63] Continuation of Ser. No. 351,454, May 15, 1989, abandoned.

[51] Int. Cl.$^5$ ............................ G01V 1/28; G01V 1/38
[52] U.S. Cl. ........................................ 367/23; 367/21; 367/59; 181/112
[58] Field of Search ........................ 367/21, 23, 24, 59, 367/60; 181/110, 112

[56] References Cited

U.S. PATENT DOCUMENTS

| | | | |
|---|---|---|---|
| 4,254,480 | 3/1981 | French | 367/58 |
| 4,476,553 | 10/1984 | Ziolkowski et al. | 367/23 |
| 4,648,080 | 3/1987 | Hargreaves | 367/20 |
| 4,692,907 | 9/1987 | Jubinski | 367/20 |
| 4,693,336 | 9/1987 | Newman | 367/112 |
| 4,752,916 | 6/1988 | Loewenthal | 367/24 |
| 4,794,573 | 12/1988 | Bell et al. | 367/57 |

OTHER PUBLICATIONS

Ziolkowski, "The Signature of an Air gun Array: Computation From Near-Field Measurements Including Interactions", *Geophysics*, vol. 47, Oct. 1982, pp. 1413-1421.
Loewenthal, "Determining Estimation of a Wavelet Using Impedance Type Technique", *Geophysical Prospecting*, vol. 33, 1985, pp. 956-969.
Hargreaves, "Far-Field Signatures by Wavefield Extrapolation" Presented at the 46th Annual EAEG Meeting in London, Eng. in Jun. 1984.
Silvia et al., "Method for Obtaining a Nearfield Inverse Scattering Solution to the Acoustic Wave Equation", *J. Acous. Soc. of Am.*, (1981), pp. 478-482.
Weglein, "Scattering Theory Approach to the Identification of the Helm holtz Equation: A Nearfield Solution" *J. Acous. Soc. of Am.*, (1981) 483-488.
Pao et al., "Huygen's Principle, Radiation Conditions, and Integral Formulas for the Scattering of Elastic Waves," *J. Acous. Soc. of Am.*, vol. 59, No. 6, Jun. 1976, pp. 1361-1371.
Loveridge, "Effects of Marine Source Array Directivity on Seismic Data and Source Signature Deconvolution", *First Break*, Jul. 1984, pp. 16-22.
Sonneland et al., "A New Method for Separating Wave Fields Into Up- and Downgoing Components, *Abstracts from the 47th Meeting of the European Association for Exploration Geophysicists*", Jun. 1985.
Sonneland et al., "2D-Deghosting Using Vertical Receiver Arrays", *Abstracts from the 48th Meeting of the European Association of Exploration Geophysicists*, Jun., 1986.
Brink et al., "Marine Seismic Exploration Using Verti-
(List continued on next page.)

*Primary Examiner*—Ian J. Lobo
*Attorney, Agent, or Firm*—Vinson & Elkins

[57] ABSTRACT

An improved method and apparatus for conducting seismic prospecting is provided wherein more accurate estimates of the source wavelet can be achieved. Receivers (202) detect pulses at vertically offset locations. The pulses are converted to digital signals in a signal processor (212) and stored on a recorder (210). A processor (108) operates on the stored signals to produce an output wavelet A'(107 ,$\theta$) in accord with the equation $\int (P.G_n - G.P_n)dx_g$.

51 Claims, 5 Drawing Sheets

OTHER PUBLICATIONS cal Receiver Arrays: Acquisition in Bad Weather", *Abstracts of the 49th Meeting of European Association of Exploration Geophysicists*, Jun., 1987.

Fricke et al., "A Standard Quantitative Calibration Procedure for Marine Seismic Sources", *Geophysics*, vol. 50, Oct. 1985, pp. 1525-1532.

Claerbout, "Fundamentals of Geophysical Data Processing with Applications to Petroleum Prospecting", *McGraw-Hill, Inc.*, 1976.

J. E. White, "Seismic Waves-Radiation, Transmission, and Attenuation", *McGraw Hill, Inc.*, 1965.

Stolt et al., *Seismic Migration-Theory and Practice*, (Geophysical Press, London-Amsterdam, 1986), pp. 166-169.

De Lima et al. "Robustness of a New Source-Signature Estimation Method Under Realistic Data Conditions: A Deterministic-Statistical Approach", *Expanded Abstracts of the Technical Program with Authors' Biographies*, vol. II, from the Sixtieth Annual International Meeting and Exposition (Society of Exploration Geophysicists, Sep. 1990), pp. 1658-1660.

Shtivelman et al., "Source Wavelet Estimation by Upward extrapolation," *Geophysics*, vol. 53, #2, Feb. 1988.

METHOD AND APPARATUS FOR IMPROVED SEISMIC PROSPECTING

The present application is a continuation of copending application Ser. No. 351,454, filed May 15, 1989, now abandoned.

TECHNICAL FIELD OF THE INVENTION

This invention relates generally to the field of seismic exploration or prospecting; and, more particularly to a method and apparatus for accurately determining the characteristics of a source wavelet.

BACKGROUND OF THE INVENTION

All human endeavor has become dependent on the steady economical supply of petroleum products. While much effort has been expended at finding alternative energy sources, there are currently no known replacements for naturally occurring oil and natural gas In order to maintain the supply balance, it is essential that the petroleum industry replace the recovered oil and natural gas with proven reserves. Because oil is a finite resource, each discovery makes the next one more difficult. Not only are hydrocarbon reserves scarce and harder to find, they tend to be located in environments that are remote and hostile. These factors, scarcity and exploration difficulty, make it vastly more expensive to locate successful commercial quantities of hydrocarbons.

These circumstances make it absolutely essential to predict more accurately the subterranean geological structures that are likely to hold commercial quantities of hydrocarbons. The industry has come to rely on seismic prospecting, a technique used to record and develop as detailed a picture as possible of subterranean geology, in an effort to locate new sources of hydrocarbons. Seismic prospecting or seismic exploration produces a geological model describing the location and physical properties of the various earth layers. The accuracy of this model is strongly dependent on the accuracy of the data used to produce the model.

The seismic data used in preparing the model are collected using a system comprised of three main components: an input source, an array of detectors and a recording apparatus. The input source generates a pulse of acoustical energy which is intended to meet certain predetermined requirements of total energy, duration, frequency, amplitude and phase. The reflected pulse is then detected by an array of either geophones or hydrophones. The detector array converts the detected pulse to an electronic digital signal which is stored on a recording instrument. The recorded digital signals are then processed by computer to construct the geological model.

Because the seismic source directly influences the quality of the recorded seismic data, it becomes highly desirable to determine the signal characteristics of the source wavelet. Various techniques are known for assessing the source signature. One technique calls for the direct measurement of the wavelet produced by the source. While it may be possible to measure correctly the wavelet of a single source, it is far more difficult, if not impossible, to measure the wavelet for a source array (such as is most often used in practice). Techniques have therefore been developed that attempt to estimate the source wavelet. One technique attempts to record the marine source signature only in very deep water so that reflections are not included. This technique is costly in practice and of no advantage for land exploration.

Another technique suggested by Ziolkowski, et al., 47 *Geophysics*, 1413 (1982) calls for recording the pressure field near each gun in the array and then computing the far field wavelet signature from this information. One disadvantage of this technique is that the computation requires very accurate knowledge of the elements of the source array and sea surface reflection coefficient. Another disadvantage is that the hydrophones must be placed in very close proximity to the source which causes premature hydrophone failure. Also fluctuations in the source depth and changes in sea state may produce undetected changes in the array signatures as may also variations in the array geometry.

Another technique for estimating the acoustic wavelet is suggested by Loewenthal, et al., 33 *Geophysical Prospecting*, 956 (1985), but assumes that (1) the medium everywhere is known and (2) the medium was only a one-dimensional variation. This is not easily achieved in practice.

Another technique suggested by Sonnland in a paper entitled "2-D Deghosting Using Vertical Receiver Arrays" presented to the Society of Exploration Geophysics in 1986 suggests using a one dimensional acoustic wave equation with two independent vertical measurements of pressure to perform a combined designatured reverberation.

Another technique suggested by Hargreaves in a paper entitled "Far-Field Signatures by Wave Field Extrapolation" presented at the 46th Annual EAEG meeting in London, England in June, of 1984, presents a wave field extrapolation method for source signature identification.

One problem with the foregoing techniques is that only the wavelet radiated vertically downward is obtained while the complete radiation pattern of the source array is not determined. Another problem is that the wavelet estimation is contaminated by extrapolation artifacts due to the presence of the scattered wave field. The severity of these problems is such that this method is inadequate for advanced seismic processing techniques such as Amplitude vs. Offsets (AVO) studies in migration/inversion, both of which require accurate knowledge of the wavelet and its radiation pattern.

SUMMARY OF THE INVENTION

An important feature of the present invention is to obtain an accurate determination of the source wavelet thereby overcoming the problems with the prior art techniques and improving the quality of the seismic survey. A more specific aspect of the invention is a method and apparatus for determining a source wavelet generated by a seismic input source. Initially, a seismic source is activated to generate a source wavelet in a medium. Changes associated with the source wavelet are then detected in the medium at two vertically off-set positions. Those detected changes in the medium are converted to signals related to the detected changes. Those observed signals are a function of the propagation path of the wave through the medium, and are also a function of variations in the source wavelet and its radiation pattern. The signals are then processed to generate a first set of extrapolated data signals where each of the extrapolations occurs in a different direction. The signals are next processed to generate a second set of extrapolated signals where each of the extrapolations occurs in a single direction. Finally, the first and second sets of extrapolated data signals are combined to determine accurately the source signature of the wavelet and its radiation pattern.

In another important feature of the invention, a system for conducting seismic profiling is provided. The system has as seismic source for generating compressional source waves directed at a subterranean target. A plurality of vertically off-set receivers is provided for detecting pulses comprised of source waves and reflections of the source waves off of the subterranean target. The detector then transmits signals representing the detected pulses. A recorder is provided for receiving and storing the transmitted signals. A processor operates on the stored signals to generate two sets of derived signals and combines the two sets of derived signals to determine the source wavelet and radiation pattern.

One advantage of this invention is that the complete source radiation pattern is obtained. Another advantage of the invention is that a more accurate estimation of the source wavelet is obtained due to removal of contamination by the scattered wave field Both advantages lead to improved results for amplitude dependent processing such AVO and migration/inversion.

BRIEF DESCRIPTION OF THE DRAWING

For a better understanding of the invention, reference is had to the following description taken in connection with the accompanying drawings, in which.

DETAILED DESCRIPTION OF THE INVENTION

Figures 1, 3:
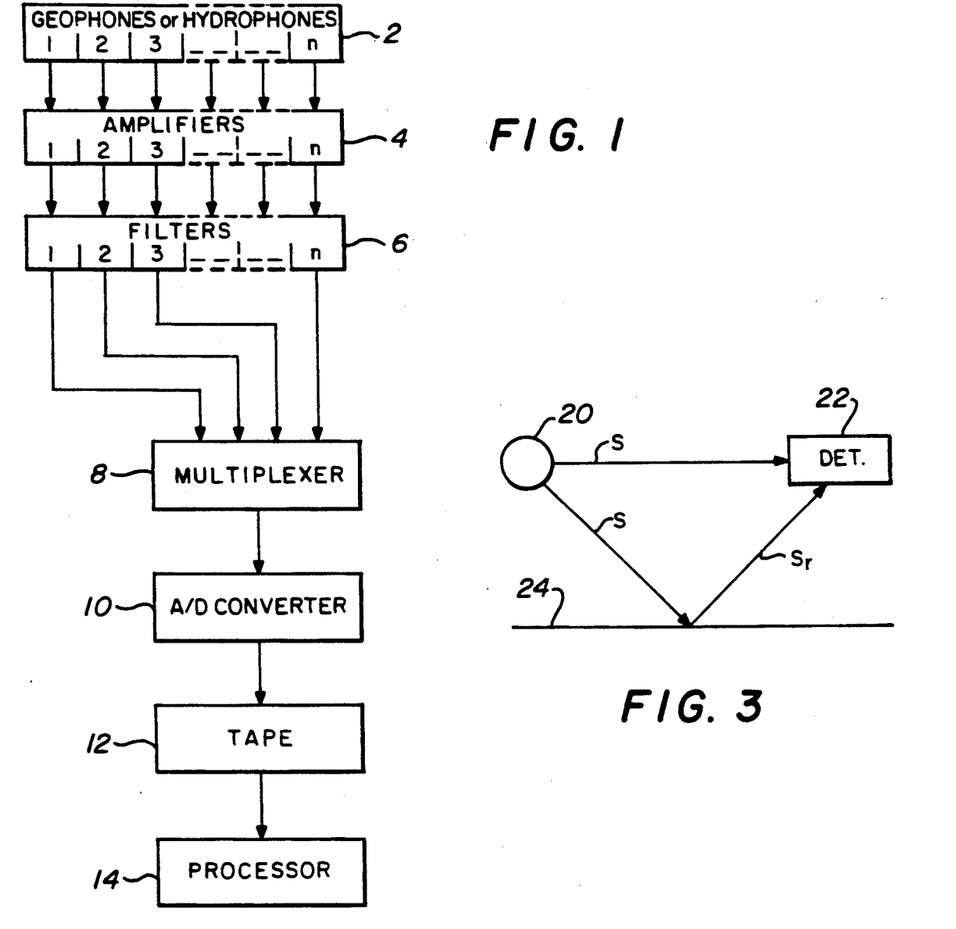
FIG. 1 shows the principle components of a digital seismic profiling system.
FIG. 3 shows the combined effect of incident and reflected source waves impinging upon a receiver.

Referring to FIG. 1, the principal components of a digital seismic prospecting system are shown. Receiver array 2 is comprised of individual geophones (for terrestrial exploration) or hydrophones (for marine exploration). For each of the receivers shown in array 2, there is an amplifier circuit, shown in amplifier array 4. Each of the amplifiers has a fixed gain for the signal received from the receiver array 2. Filter array 6, comprised of individual filter circuits for each of the receivers in receiver array 2, is connected to amplifier array 4 and is provided to eliminate unwanted and extraneous signals. In terrestrial exploration, low cut filters are provided tuned to the natural frequency response of the geophone in order to avoid harmonic distortion. In marine exploration, low cut filters are provided to reduce streamer and other low frequency and environmental noise. High cut filters are also supplied with the cut-off related to the digital sampling interval so that aliassing does not occur. Filter array 6 may also include a notch filter. Such filters are provided, for instance to eliminate such things as high-voltage power line interference.

Signals received by signal array 2, amplified by amplifier array 4 and filtered through filter array 6 are passed to multiplexer 8. Each of the three steps previously described, receiving the signal, amplifying the signal and filtering the signal are performed simultaneously at each level and in parallel. Because of the high-speed processing capability of modern digital electronic computer systems, it is more efficient to store the analog voltage signal supplied by filter array 6 and then, through the switching circuitry of multiplexer 8, feed those signals in series to analog to digital (A/D) converter 10.

A/D converter 10 samples each of the signals provided by multiplexer 8 and converts that analog voltage signal to multi-bit binary data. The binary data from A/D converter 10 is formatted and written to magnetic tape using a conventional digital tape deck 12. Digital tape 12 can then be processed on processor 14 which is a conventional digital stored program computer.

To convert the field data, recorded on digital tape 12, into a geological model requires substantial data manipulation. Various techniques, well known to those skilled in the art, are used to correct for normal move-out and such things as near-surface time delays. The next step is to perform a deconvolution because the seismic trace is treated as a convolution of a series of reflection coefficients of the earth with a wavelet. The objective of the deconvolution process is to unravel the convolution to arrive back at the reflection coefficient series. Decomposing the seismic trace into its wavelet component and reflection coefficient series requires an accurate estimation of the actual wavelet. Ideally, the perfect wavelet would be a single spike at t=0. As with most things in life, the ideal is unobtainable.

Figure 2:
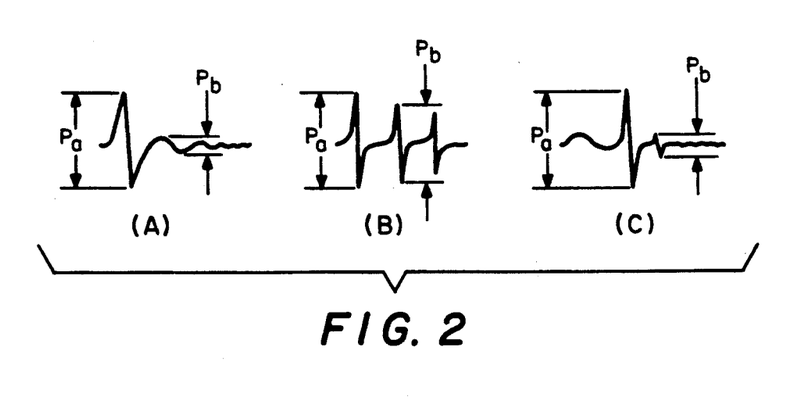
FIG. 2 depicts various signatures for a seismic

Referring to FIG. 2A, a wavelet having a source signature is provided with a high-spike and attenuated trailing oscillations. In FIG. 2B the source wavelet is provided where the trailing oscillations are not deliberately attenuated to provide for cross-correlation. In FIG. 2C the wavelet is generated by a source array designed neither to generate a secondary oscillation nor to attenuate that secondary oscillation.

Knowledge of the actual wavelet and its radiation pattern are important for conventional processing and critical for advanced processing. In actual practice, it has been difficult to establish the actual source wavelet or radiation pattern. Referring to FIG. 3, a source 20 generates a signal S that is transmitted in all directions. Detector 22, which corresponds to either the geophones or hydrophones depicted in receiver array 2 of FIG. 1, receives wavelet S generated by source 20 and wavelet $S_r$ reflected off of surface 24. This invention provides a method for subtracting the reflected source wave, $S_{r'}$ from the signal received by detector 22 so that a better estimation of the source wavelet S can be made.

Two problems with prior extrapolation techniques at deriving an accurate estimation of the source wavelet have been: (1) only the wavelet radiated vertically downward is obtained so that the complete radiation pattern of the source array is not determined; and (2) the wavelet estimate is contaminated by extrapolation artifacts due to the presence of the scattered wave field. The first problem with the existing techniques can be solved by extrapolating the wave field several times, each time in a different direction from the source. This will give the radiation pattern. The second problem can be solved in one of two ways; either by measuring the wave and its derivative or by extrapolating the wave field several times, each time in the same direction from the source. This will give several estimates at the same angle. For each estimate the source wave field will be the same (if aperture corrections are included), but the contamination due to the scattered field will be different. Thus, an improved wavelet estimate can be obtained by statistical combination of the estimates for the same direction.

What follows is a detailed mathematical derivation of a formula for automatically filtering the scattered field from the wavelet calculation. First, a new general method of source signature identification is measurements. This method is applicable for an arbitrary inhomogeneous multi-dimensional acoustic elastic (or elastic) wavelet anisotropic earth. Furthermore, no information about the properties of the sub-surface is required; Each shot record produces an effective acoustic (or elastic) wavelet for that particular shot record. The effective wavelet can vary from one shot record to the next. The wavelet obtained is the source wavelet or driving function being imparted to the medium. In section II, the general wavelet estimation procedure is presented showing that the method relies only on the incident wave, effectively filtering the scattered energy from the integral. In section III, the procedure is illustrated with analytic and numerical examples. The marine exploration environment is given in section IV. The application to a distributed source in the source array pattern is given in section V. In section VI, an application of the method is described for a multi-dimensional problem.

The basic ingredients of the procedure (for either the acoustic or elastic model) derived from a comparison of the Lippman Schwinger equation and Green's theorem. The former originates in scattering theory and the latter in boundary value problems. These two equations were compared, for a different purpose, in Silvia et al., "A Method For Obtaining A Near-Field Inverse Scattering Solution To The Acoustic Wave Equation", 69 *J. Acous. Soc. Of Am.*, 478 (1981) and Weglein et al. "A Scattering Theory Approach To The Identification Of The Helmoltz Equation: A Near-Field Solution", 69 *J. Acous. Soc. Of Am.*, 483 (1981) which are incorporated herein by reference.

Figure 4:
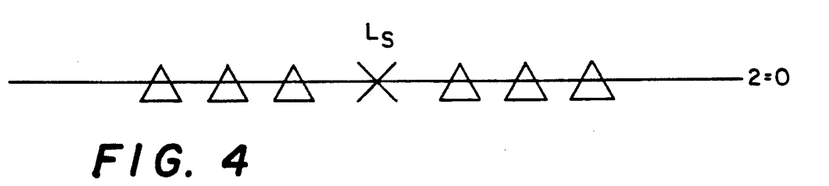
FIG. 4 illustrates a seismic experiment with a localized source.

Consider the seismic experiment illustrated in FIG. 4. Assume that the source is localized at position $r_s$. The constant density, acoustic equation for the pressure field, P, due to a source A(t) at $r_s$ is $$\left(\nabla^2 - C^{-2}(r)\frac{\partial^2}{\partial t^2}\right)P(r, r_s, t) = A(t)\delta(r - r_s)$$

Taking the Fourier transform in time gives, $$(\nabla^2 + C^{-2}(r)\omega^2) P(r, r_s, \omega) = A(\omega)\delta(r - r_s) \quad [1]$$

In this context, the wavelet estimation problem is to determine $A(\omega)$. Characterize the velocity configuration, $c(r)$ in terms of a reference value, $c_0$, and a variation in the index of refraction, $\alpha$;

$$C^{-2}(r) = C_0^{-2}(1 - \alpha(r))$$

Equation [1] can them be rewritten as $$(\nabla^2 + C_0^{-2}\omega^2)P = C_0^{-2}\omega^2\alpha P + A(\omega)\delta(r - r_s) \quad [2]$$

We now proceed to derive two integral equations for P. One is the Lippmann Schwinger integral equation and other is derived from Green's second identity. These two equations will lead to the desired relationship between the sought after $A(\omega)$ and the measurements of F on the surface $z=0$.

Inverting the operator; $\nabla^2 + C_0^{-2}\omega^2 = L_0 = G_0^{-1}$ in Eq. [2], we have, $$P = G_0 C_0^{-2}\omega^2 \alpha P + A G_0$$

or $$P(r, r_s, \omega) = A(\omega)G_0(r, r_s, \omega) + \int_\infty G_0(r, r', \omega)C_0^{-2}\omega^2\alpha(r')P(r', r_s, \omega)dr' \quad [3]$$

where $$(\nabla^2 + C_0^{-2}\omega^2)G_0(r, r', \omega) = \delta(r - r')$$

Figures 5, 6:
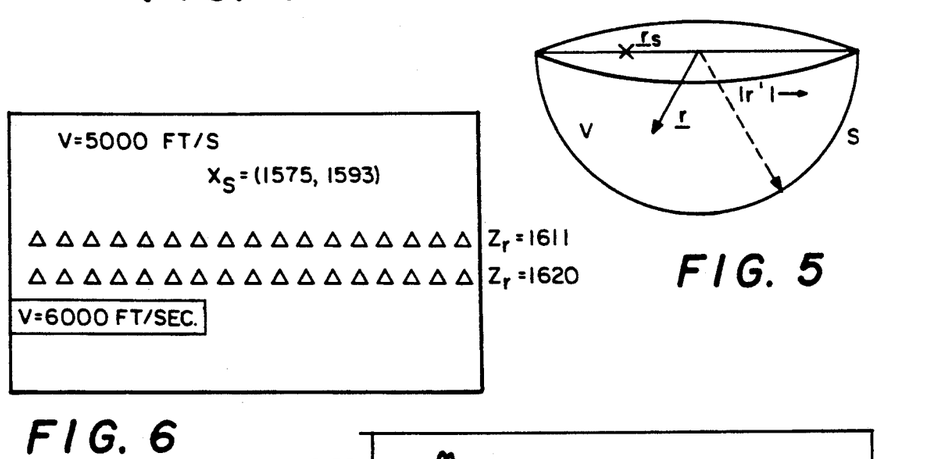
FIG. 5 shows a subsurface volume for illustrating a feature of the invention.
FIG. 6 is a model for a 2-D finite difference numerical example.

Eq. [3] is the Lippmann Schwinger integral equation and is valid for all r. A second integral equation for P is derived from Green's second identity:

$$\int_v (A\nabla^2 B - B\nabla^2 A)d^3r = \int_s (A\nabla B - B\nabla A)\cdot n ds$$

where S is the surface which encloses the volume $\nabla$. Let $A=P$ and $B=G_0$ in Green's second identity:

$$\int_v [P(r', r_s, \omega)\nabla'^2 G_0(r', r, \omega) - G_0(r', r, \omega)\nabla'^2 P(r', r_s, \omega)]dr' = \quad [4]$$
$$\int_s [P(r', r_s, \omega)\nabla' G_0(r', r, \omega) - G_0(r', r, \omega)\nabla' P(r', r_s, \omega)]\cdot n ds$$

where S is the surface illustrated in FIG. 5.

$r_s$ is located on the $z=0$ boundary of the surface S. We choose the convention for the delta function to be:

$$\int_v \delta(r-a)f(r)dr = f(a)$$

where a is strictly within the volume. For a outside the volume, or on the boundary, this integral vanishes.

Using the equations, $$\nabla'^2 P(r', r_s, \omega) = C_0^{-2}\omega^2 P(r', r_s, \omega) + C_0^{-2}\omega^2\alpha(r')P(r', r_s, \omega) + A(\omega)\delta(r' - r_s)$$

and $$\nabla'^2 G_0(r', r, \omega) = -C_0^{-2}\omega^2 G_0(r', r, \omega) + \delta(r' - r)$$

we have from equation [4] that for r within the volume $$P(r, r_s, \omega) = \int_v G_0(r, r', \omega) C_0^{-2} \omega^2 \alpha(r') P(r', r_s, \omega) dr' + \quad [5]$$

$$\int_s [P(r', r_s, \omega) \nabla' G_0(r', r, \omega) - G_0(r', r, \omega) \nabla' P(r, r_s, \omega)] \cdot nds$$

For r within the volume we have two expressions for P. These two integral equations (equations [3] and [5]) were studied in two papers: Silvia et al., "A Method For Obtaining A Near-Field Inverse Scattering Solution to the Acoustic Wave Equation," 69 *J. Acous. Soc. of Am.* 478 (1981) and Weglein et al., "A Scattering Theory Approach to the Identification of the Helmoltz Equation: A Near-Field Solution," 69 *J. Acous. Soc. of Am.* 483 (1981).

For points r within the volume, equations [3] and [5] give two expressions for the field in the reference medium; i.e.;

$$A(\omega) G_0(r, r_s, \omega) =$$

$$\int_s [P(r', r_s, \omega) \nabla' G_0(r', r, \omega) - G_0(r', r, \omega) \nabla' P(r', r_s, \omega)] \cdot nds$$

and solving for $A(\omega)$:

$$A(\omega) = G^{-1}_0(r, r_s, \omega) \int_s [P(r', r_s, \omega) \nabla' G_0(r', r, \omega) - G_0(r', r, \omega) \nabla' P(r', r_s, \omega)] \cdot nds \quad [6]$$

The numerator and denominator can be evaluated at any point inside the volume In principle, one evaluation point will suffice to determine $A(\omega)$. However, in practice, N such evaluations of the numerator and denominator will give us N independent estimates of $A(\omega)$ for each source location. A statistical weighting of these estimates is then used to optimally evaluate the wavelet. Consequently, in practice, the method involves a combination of deterministic and statistical procedures. It will be shown later that this redundancy can be used to solve for the source array pattern.

The total field P and its normal derivative $\nabla' P \cdot n$ depend on both the wavelet and the subsurface properties. However, it has been shown that $$\int_s [P \nabla' G_0 - G_0 \nabla' P] \cdot nds$$

depends only on the wavelet. The major conclusion is that measurement of P and $\nabla P \cdot n$ on the surface of the earth is sufficient to determine the source wavelet; without requiring any information about the subsurface properties. It will now be shown that the above integral only depends on the incident field by showing that the integral for the scattered wave is zero. This can be seen by considering the integral over the scattered field and showing that this integral goes to zero. Thus since:

$$(\nabla^2 + C_0^{-2} \omega^2) G_0(r, r', \omega) = \delta(r - r')$$

and $$(\nabla^2 + C_0^{-2} \omega^2) P_s = C_0^{-2} \omega^2 \alpha P$$

we have, by substituting into Green's second identity:

$$\int_s [P_s \nabla' G_0 - G_0 \nabla' P_s] \cdot nds = P_s - \int_v G_0 C_0^{-2} \omega^2 \alpha(r') P dr = P_s - P_s = 0$$

and thus the only contribution to the integral in equation [6] is the incident wave.

We illustrate this method with one dimensional and multi-dimensional examples.

I. WAVELET ESTIMATION

One Dimensional—Localized Inhomogeneity

We will illustrate this method for the one dimensional model characterized by, $$C^{-2}(r) = C_0^{-2} [1 - \lambda \delta(x - x_0)]; \quad \alpha = \lambda \delta(x - x_0)$$

Now, equation [6] will be evaluated, $$G_0^{-1} \int_s [P \nabla G_0 - G_0 \nabla P] \cdot nds$$

The Green's function, $G_0$ is given by, $$G_0 = (2ik)^{-1} e^{ik|x - x'|} \quad [7]$$

and satisfies, $$\frac{d^2 G_0}{dx^2} + k^2 G_0 = \delta(x - x') \quad [8]$$

Where $k = \omega/c_0$ and $c_0$ is the reference velocity.

For an impulsive source at $x_s$ the incident field is, $$(2ik)^{-1} A(\omega) e^{ik|x - x_s|}$$

The total wavefield, P, satisfies;

$$\frac{d^2 P}{dx^2} + k^2 (1 - \alpha) P = A(\omega) \delta(x - x_s) \quad [9]$$

The problem is to determine the wavelet, $A(\omega)$, from the boundary measurements of P. The Lippmann Schwinger equation, valid for all x, is $$P = P_0 + G_0 k^2 \alpha P$$

or,

For the localized scatterer, $\alpha = \lambda \delta(x - x_0)$ the total wavefield is, $$P(x, x_s, \omega) = (2ik)^{-1} A(\omega) e^{ik|x - x_s|} + (2ik)^{-1} e^{ik|x - x_0|} k^2 \lambda P(x_0, x_s, \omega)$$

[11a]

To find $P(x_0, x_s, \omega)$, set $x = x_0$ in the last equation, $$P(x_0, x_s, \omega) = (2ik)^{-1} A(\omega) e^{ik|x_0 - x_s|} + (2ik)^{-1} k^2 \lambda P(x_0, x_s, \omega)$$

or, $$P(x_0, x_s, \omega) = \frac{(2ik)^{-1} A(\omega) e^{ik|x - x_s|}}{1 + .5ik\lambda}$$

and $P(x, x_s, w)$ from [11a] becomes $$P(x, x_s, \omega) = (2ik)^{-1} A(\omega) e^{ik|x - x_s|} - \quad [11b]$$

$$.25\lambda (1 + .5ik\lambda)^{-1} A(\omega) e^{ik|x - x_0|} e^{ik|x_0 - x_s|}$$

The total wavefield $P(x, x_s, \omega)$ is a function of the wavelet, $A(\omega)$, and the medium (through $c_0$, $k = \omega/c_0, x_0$ and $\lambda$). The second integral representation, derived from Green's second identity, is a follows, $$\int_a^b \left( \frac{Pd^2G_0}{dx^2} - G_0 \frac{d^2P}{dx^2} \right) dx = \int_a^b \left( \frac{PdG_0}{dx} - G_0 \frac{dP}{dx} \right) \quad [12]$$

where $a < x_0 < b$.

Use of the differential equations [8] and [9] in the left hand side of [12] leads to, $$\int_a^b [P(x', x_s, \omega)\delta(x - x') - k^2 \alpha(x') P(x', x_s, \omega) G_0(x, x', \omega) -$$

$$G_0(x, x', \omega) A(\omega) \delta(x' - x_s)] dx') = |_a^b \left( \frac{PdG_0}{dx'} - G_0 \frac{dP}{dx'} \right)$$

For $a < x < b$, and $x_s < a$, this last expression is, $$-k^2 \int_a^b G_0(x, x', \omega) \alpha(x') P(x', x_s, \omega) dx' + P(x, x_s, \omega) -$$

$$A(\omega) G_0(x, x_s, \omega) = |_a^b \left( P(x', x_s, \omega) \frac{dG_0(x, x', \omega)}{dx'} - \right.$$

$$\left. G_0(x, x', \omega) \frac{dP(x', x_s, \omega)}{dx'} \right)$$

and solving for $P(x, x_s, \omega)$, $$P(x, x_s, \omega) =$$

$$k^2 \int_a^b G_0(x, x', \omega) \alpha(x') P(x', x_s, \omega) dx' + A(\omega) G_0(x, x_s, \omega) +$$

$$|_a^b \left( P(x', x_s, \omega) \frac{dG_0(x, x', \omega)}{dx'} - G_0(x, x', \omega) \frac{dP(x', x_s, \omega)}{dx'} \right)$$

If the region of support of $\alpha(x)$ is within the interval $a < x < b$, then, $$\int_a^b G_0(x, x', \omega) k^2 \alpha(x') P(x', x_s, \omega) dx' =$$

$$\int_{-\infty}^{\infty} G_0(x, x', \omega) k^2 \alpha(x') P(x', x_s, \omega) dx'$$

and for $x$ within the interval $(a,b)$ it follows from [11a] and [13] that, $$(2ik)^{-1} A(\omega) e^{ik|x - x_s|} = \quad [14]$$

$$|_a^b \left( P(x', x_s, \omega) \frac{dG_0(x, 'x', \omega)}{dx'} - G_0(x, x', \omega) \frac{dP(x', x_s, \omega)}{dx'} \right)$$

and $$A(\omega) = \frac{|_a^b \left( P(x', x_s, \omega) \frac{dG_0}{dx'} - G_0(x, x', \omega) \frac{dP(x', x_s, \omega)}{dx'} \right)}{(2ik)^{-1} e^{ik|x - x_s|}}$$

This is obviously the one dimensional reduction of our wavelet determination scheme, equation [6], i.e;

$$A(\omega) = G^{-1} \int_s (P\nabla G_0 - G_0 \nabla P) \cdot n ds$$

We now evaluate the right hand side of equation [14] for the case of a localized scatterer. We need the Green's function, $$G_0 = (2ik)^{-1} e^{ik|x - x'|}$$

and its derivative $$\frac{dG_0}{dx'} = .5 e^{ik|x - x'|} SGN(x - x')$$

The wave field (from [11b]) is, $$P(x, x_s, \omega) = A(\omega) \left( (2ik)^{-1} e^{ik|x - x_s|} \frac{-0.25\lambda e^{ik|x - x_0|} e^{ik|x_0 - x|}}{1 + .5i\lambda k} \right)$$

and its derivative is, $$\frac{dP(x, x_s, \omega)}{dx} = A(\omega) \left( .5 e^{ik|x - x_s|} SGN(x - x_s) \frac{-.25\lambda e^{ik|x - x_0|} e^{ik|x_0 - x_s|} ik \, SGN(x - x_0)}{1 + 0.5i\lambda k} \right)$$

We now evaluate equation [14] to obtain, $$A(\omega) = \frac{|_a^b \left( P(x', x_s, \omega) \frac{dG_0(x, x', \omega)}{dx'} - G_0(x, x', \omega) \frac{dP(x', x_s, \omega)}{dx'} \right)}{(2ik)^{-1} e^{ik|x - x_s|}}$$

and thus, $$A(\omega) = |_a^b 2ike^{-ik|x - x_s|} A(\omega) \{ [(2ik)^{-1} e^{ik|x' - x_s|} - .25\lambda(1 + .5i\lambda k)^{-1} e^{ik|x' - x_0|} e^{ik|x_0 - x_s|}] \\ [.5 e^{ik|x - x'|} SGN(x' - x)] - \\ (2ik)^{-1} e^{ik|x - x'|} [.5 e^{ik|x' - x_s|} SGN(x' - x_s) - \\ .25\lambda(1 + .5i\lambda k)^{-1} e^{ik|x' - x_0|} e^{ik|x_0 - x_s|} ik \, SGN(x' - x_0)] \}$$

Simplifying, this becomes, $$A(\omega) = 2ike^{-ik|x - x_s|} A(\omega) \{ (4ik)^{-1} [e^{ik|a - x_s|} e^{ik|x - a|} \\ e^{ik|x - a|} e^{ik|a - x_s|}] \}$$

Removing the absolute value signs with $a < x < b$; $a < x_0 < b$; $x_s < a$;

$$A(\omega) = \frac{2ikA(\omega)}{e^{ik|x - x_s|}} \left( \frac{e^{ik|x - x_s|}}{2ik} \right) = A(\omega)$$

which was to be shown. Notice that although P and δP depend on the medium through $c_0, \lambda$, and $x_0$, the integral $$\int_s \left\{ P \frac{\partial G_o}{\partial n} - G_o \frac{\partial P}{\partial n} \right\} \cdot nds$$

is only a function of the source signature.

II. TWO DIMENSIONAL NUMERICAL EXAMPLE

A numerical examples is now provided by solving a two-dimensional acoustic finite difference forward problem with a point source at $x_s$, and a finger scatterer, as shown in FIG. 6. Two lines of receivers are located at $z_r$ and $z_{r+1}$. The wavelet estimation equation for this case is then:

$$A(\omega) = \frac{\int_s \left\{ P(r',r_s,\omega) \frac{\partial G_o(r',r,\omega)}{\partial n} - G_o(r',r,\omega) \frac{\partial P(r',r_s,\omega)}{\partial n} \right\} ds}{G_o(r,r_s,\omega)}$$

For the two dimensional case considered, the Green's function becomes:

$$G_o(r',r,\omega) = -0.25 i H_o(2)(k_o r); \quad r = \sqrt{(x-x')^2 + (z-z')^2}$$

The normal derivative of the Green's function becomes:

$$\frac{\partial G_o}{\partial n} = \frac{-\partial G_o}{\partial z'} = 0.25 r^{-1} i k_o (z'-z) H_1(2)(k_o r)$$

and thus the wavelet estimation equation is:

$$A(\omega) = H_o^{-1}(2)(k_o r_s) \int_{x_o}^{x_1} \left\{ P(r',r_s,\omega) k_o r^{-1}(z'-z) H_1(2)(k_o r) + H_o(2)(k_o r) \frac{\partial P}{\partial z'} (r',r_s,\omega) \right\} dx' \quad [15]$$

Figure 7:
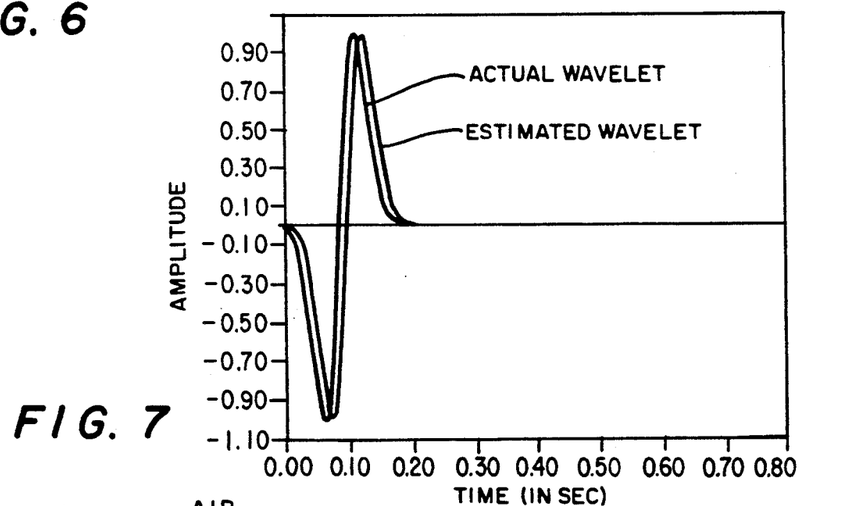
FIG. 7 shows the estimated wavelet vs. the actual wavelet.

The normal derivative of the pressure field is approximated by the Eulerian derivative of the pressure field obtained at the two depth levels. The integral in equation [15] is numerically evaluated from the sampled data obtained from the finite difference algorithm. The results of estimating the wavelet are shown in FIG. 7, where the input wavelet is shown as the dark line and the estimated wavelet is shown as the light line. The two wavelets are offset in time to exhibit their shapes. For the point source shown, the point, r, at which the integral is evaluated can be chosen arbitrarily.

III. WAVELET ESTIMATION IN A SPATIALLY VARIANT REFERENCE MEDIUM

Consider the single temporal frequency constant density acoustic equation, $$(\nabla^2 + c^{-2}(r)\omega^2)P(r,r_s,\omega) = A(\omega)\delta(r-r_s) \quad [16]$$

Characterizing the acoustic velocity, $c(r)$, in terms of spatially variant reference value, $c_0(r)$ and the variation in the index of refraction, $a_1(r)$, $$c^{-2}(r) = c_0^{-2}(r)[1-a_1(r)] \quad [17]$$

Rewrite equation [16] using [17] as follows, $$(\nabla^2 + c_0^{-2}(r)\omega^2)P(r,r_s,\omega) = c_0^{-2}(r)\omega^2 a_1(r)P(r,r_s,\omega) + A(\omega)\delta(r-r_s) \quad [18]$$

Invert the operator $(\nabla^2 + c_0^{-2}(r)\omega^2) = G_1^{-1}$, to find, $$P(r,r_s,\omega) = \int_V G_1(r,r',\omega) c_0^{-2}(r')\omega^2 a_1(r')P(r',r_s,\omega)dr' + A(\omega)G_1(r,r_s,\omega) \quad [19]$$

Equation [19] is an expression for P at every point r. $G_1(r,r_s,\omega)$ satisfies $$(\nabla^2 + c_0^{-2}(r)\omega^2)G_1(r,r_s,\omega) = \delta(r-r_s) \quad [20]$$

with outgoing wave boundary conditions.

Green's second identity is used to derive an expression for P inside the volume enclosed by the measurements; i.e., $$\int_V (\Psi \nabla^2 \phi - \phi \nabla^2 \Psi) d\tau = \phi_s (\Psi \nabla \phi - \phi \nabla \Psi) \cdot nds) \quad [21]$$

Let $\Psi = P$ and $\phi = G_1$, and using [16] and [20] in [21], we find;

$$\int_V \{P(r',r_s,\omega)\{-c_0^{-2}(r')\omega^2 G_1(r,r',\omega) + \delta(r-r')\} - G_1(r,r',\omega)\{-c_0^{-2}(r')\omega^2 P(r',r_s,\omega) + c_0^{-2}(r')\omega^2 a_1(r')P(r',r_s,\omega) + A(\omega)\delta(r'-r_s)\}\} dr' = \int_s \left\{ P(r',r_s,\omega) \frac{\partial G_1(r,r',\omega)}{\partial n} - G_1(r,r',\omega) \frac{\partial P(r',r_s,\omega)}{\partial n} \right\} ds \quad [22]$$

As in the constant background case, the source is again chosed to be exterior to the volume under consideration. If the source is on the boundary, then we choose the convention which considers the boundary as outside the volume.

Thus $r_s \in V$ and $$\int_V c_0^{-2}(r')\omega^2 a'(r')G_1(r,r',\omega)P(r',r_s,\omega)dr' + \int_s \left\{ P(r',r_s,\omega) \frac{\partial G_1(r,r',\omega)}{\partial n} - G_1(r,r',\omega) \frac{\partial P(r',r_s,\omega)}{\partial n} \right\} ds = \begin{cases} P(r,r_s,\omega) & r \in V \\ 0 & r \notin V \end{cases} \quad [23]$$

If the support of $a_1(r')$ is within the volume V then $$\int_V c_0^{-2}(r')\omega^2 a'(r')G_1(r,r',\omega)P(r',r_s,\omega)dr' = \int_{\approx} c_0^{-2}(r')\omega^2 a'(r')G_1(r,r',\omega)P(r',r_s,\omega)dr'$$

Equations [15] and [23], for points $r \in V$ lead to an expression for the wavelet, $A(\omega)$ in terms of measurements of P and $$\frac{\partial P}{\partial n}$$

on S;

$$A(\omega) = \frac{\int_S \left( P(r',r_s,\omega) \frac{\partial G_1(r,r',\omega)}{\partial n} - G_1(r,r',\omega) \frac{\partial P(r',r_s,\omega)}{\partial n} \right) ds}{G_1(r,r_s,\omega)} \quad [24]$$

IV. MARINE WAVELET ESTIMATION

Figure 8:
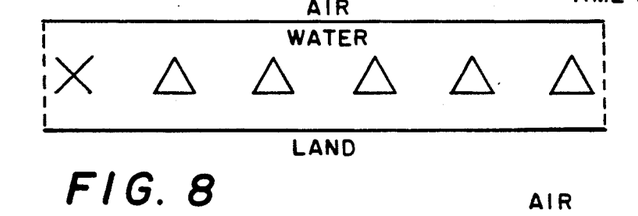
FIG. 8 illustrates a marine exploration geometry.
Figure 9:
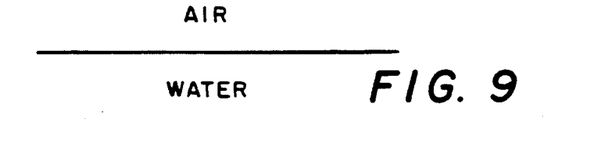
FIG. 9 illustrates the background medium for the marine case.

The marine exploration configuration is illustrated in FIG. 8. The background medium for this application will consist of two homogeneous half spaces illustrated in FIG. 9. For this geometry, $G_1$ is given by the equation, $$G_1(x,z,x_s,z_s,\omega) = \int_{-\infty}^{\infty} \frac{e^{-ik_x(x-x_s)}}{i\sqrt{\left(\frac{\omega}{c_1}\right)^2 - k_x^2}} \left\{ e^{-i\sqrt{\left(\frac{\omega}{c_1}\right)^2 - k_x^2}\,|z - z_s|} + \frac{\frac{\rho_2}{\rho_1}\sqrt{\left(\frac{\omega}{c_1}\right)^2 - k_x^2} - \sqrt{\left(\frac{\omega}{c_1}\right)^2 - k_x^2 + \omega^2 \Delta}}{\frac{\rho_2}{\rho_1}\sqrt{\left(\frac{\omega}{c_1}\right)^2 - k_x^2} + \sqrt{\left(\frac{\omega}{c_1}\right)^2 - k_x^2 + \omega^2 \Delta}} \times e^{-i\sqrt{\left(\frac{\omega}{c_1}\right)^2 - k_x^2}\,(z + z_s)} \right\} dk_x$$

and $\frac{dG_1}{dZ_s}$ is given as, $$\frac{dG_1}{dZ_s} = \int_{-\infty}^{\infty} \frac{e^{-ik_x(x-x_s)}}{i\sqrt{\left(\frac{\omega}{c_1}\right)^2 - k_x^2}} \left\{ e^{-i\left(\sqrt{\left(\frac{\omega}{c_1}\right)^2 - k_x^2}\,|z - z_s|\right)} i\sqrt{\left(\frac{\omega}{c_1}\right)^2 - k_x^2}\, SGN(z_s - z) + \frac{\frac{\rho_2}{\rho_1}\sqrt{\left(\frac{\omega}{c_1}\right)^2 - k_x^2} - \sqrt{\left(\frac{\omega}{c_1}\right)^2 - k_x^2 + \omega^2 \Delta}}{\frac{\rho_2}{\rho_1}\sqrt{\left(\frac{\omega}{c_1}\right)^2 - k_x^2} + \sqrt{\left(\frac{\omega}{c_1}\right)^2 - k_x^2 + \omega^2 \Delta}} \times e^{-i\left(\sqrt{\left(\frac{\omega}{c_1}\right)^2 - k_x^2}\,(z + z_s)\right)} \left(-i\sqrt{\left(\frac{\omega}{c_1}\right)^2 - k_x^2}\right) \right\} dk_x$$

where $c_1$ is the acoustic velocity of water and $\Delta = c_2^{-2} - c_1^{-2}$

V. DISTRIBUTED SOURCE

If the source consists of a sequence of localized point sources at $r_{s1}, r_{s2}, \ldots, r_{sn}$, each with the same time dependence, then the wavelet $A(\omega)$ is given by, $$A(\omega) = \frac{\int_S \left( P(r',r_s,\omega) \frac{\partial G_o(r,r',\omega)}{\partial n} - G_o(r,r',\omega) \frac{\partial P(r',r_s,\omega)}{\partial n} \right) ds'}{\sum_{j=1}^{n} G_o(r,r_{sj},\omega)}$$

and P satisfies the differential equation, $$\nabla'^2 P(r,r_s,\omega) + c_o^{-2} \omega^2 (1 - \alpha(r')) P(r,r_s,\omega) = A(\omega) \sum_{j=1}^{n} \delta(r - r_{sj})$$

and is the total field due to the n distributed point sources. However, if the localized point sources are each different, we can use the fact that r is arbitrary to obtain the system of equations:

$$\sum_{j=1}^{n} A_j(\omega) G_o(r_i,r_{sj},\omega) = \int_S \left( P(r',r_{s1}\ldots r_{sn},\omega) \frac{\partial G_o(r_i,r',\omega)}{\partial n} - G_o(r_i,r',\omega) \frac{\partial P(r',r_{s1}\ldots r_{sn},\omega)}{\partial n} \right) ds'$$

$(i = 1, \ldots m)$

This system of equations can be solved in a least squares sense for the $A_j(\omega)$. Alternatively, the radiation pattern from a single effective point source could be determined by assuming that $A(\omega)$ is also a function of the radius r and thus the relative strength of the source field can be obtained by evaluating the numerator of equation [24] for various r on a constant radius about the source.

VI. ELASTIC WAVELET ESTIMATION METHOD

Outlined below is the generalization of the wavelet estimation method for elastic waves. As in the acoustic case, a comparison of the Lippmann Schwinger and Green's theorem is used to determine the wavelet.

The Green's theorem result (e.g., Pao et al., "Huygen's Principle, Radiation Conditions, and Integral Formulas for the Scattering of Elastic Waves," 59 *J. Acous. Soc. of Am.* 6 (1976), equation [19]) for elastic waves is given by, $$\int \rho f(x') \cdot =G_1(x,x')dx' + \int_s \{t(x') \cdot =G_1(x,x') -$$

$$u(x') \cdot [n' \cdot \Sigma=(x|x')]\}ds = \begin{cases} u(x) & x \in V \\ 0 & x \cancel{\in} V \end{cases}$$

where u(x,t) is the displacement vector, $t = n \cdot T=$, where t is the traction on the surface, $T=$ is the stress tensor, n is the unit vector normal to the surface, f is the body force per unit mass, $=G_1$ is the Green's displacement tensor and $\Sigma=$ is the third rank Green's tensor.

Let $=G_1$ be the response in a homogeneous medium and f the passive sources (the scattering centers) of the scattered displacement field originating from the inhomogeneities in the medium. The physical source is outside the volume V. In Pao et al., supra, f represents the body force per unit mass (and is inside the volume). There an active physical source was considered inside the homogeneous medium. Here, a physical source is considered outside an inhomogeneous medium with passive scattering sources inside V.

Let $u_{mn}(x,x')$ be the displacement at x in the n axis direction due to a source at x' in the m axis direction. The source is $A_m(\omega)\delta(x,x')\pi$ where $\pi$ is the unit dyadic.

The wavelet $A(\omega)$ can be found after writing the Lippmann Schwinger equation for elastic waves by dividing the surface term in equation [20] of Pao et al., supra, (its mn-th component), $$[\rho c^2 p \int_s \{=G_1 \cdot n')(\nabla' \cdot u) - (\nabla' \cdot =G_1)(u \cdot n')\}ds' - \rho c^2_s \int_s \{G_1 \cdot (n' \times \nabla' \times u) + (\nabla' \times =G_1) \cdot (n' \times u)\}ds']_n \text{ by } G_{mn}.$$

Figures 10, 11:
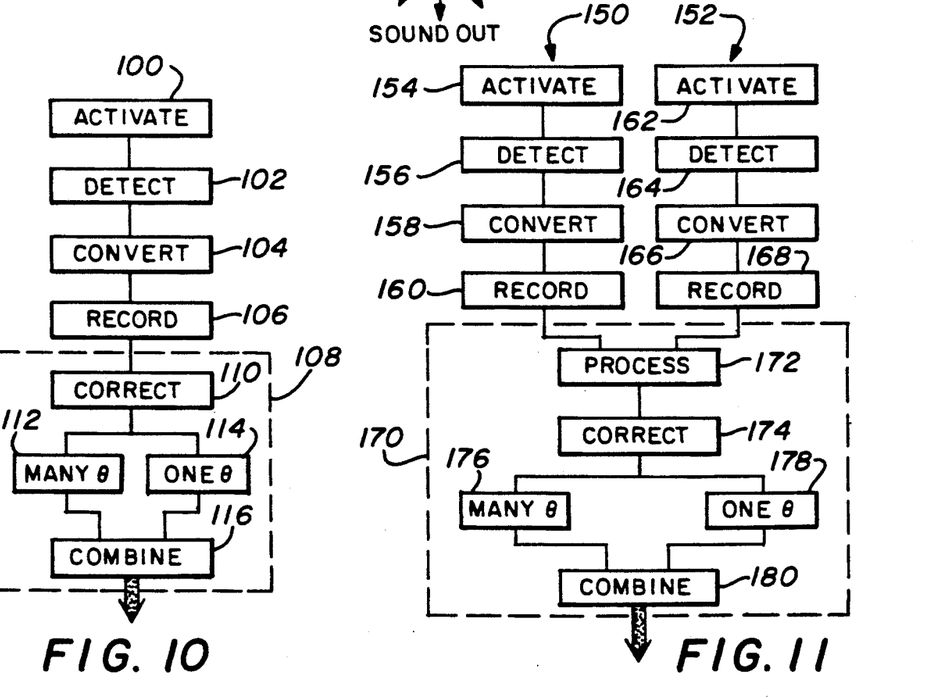
FIG. 10 is a flow diagram of one embodiment of the invention.
FIG. 11 is a flow diagram illustrating an alternative embodiment of the invention.

The flow diagram of FIG. 10 illustrates one embodiment of the invention that employs the foregoing formulas. A seismic source is activated, step 100, to generate a source wavelet in a medium. Typically, the source generates a down going or incident compressional wave directed at a subterranean target however, other waves such as shear waves may in some cases also be generated. In the next step 102, a pulse comprised of a source wavelet or incident wave and the various reflections off the subterranean target is received by a detector. The detection step 102 may be performed by a plurality of detectors or receivers configured in a predetermined array.

In the next step 104, the detected pulse is converted to a digital signal. The signals produced by the conversion step 104 are recorded to digital tape in step 106 for subsequent processing. The subsequent processing is represented at 108. In correction step 110, various filtering techniques are applied, such as correcting for aperture, before performing the processing steps 112 and 114. In step 112, the wave field is extrapolated several times, each time in a different direction from the source. In step 114, the wave field is extrapolated several times, each time in the same direction from the source. The result of step 112 will give the radiation pattern. While the result of step 114 will provide different contaminations due to the presence of the scattered field. The result of steps 112 and 114 are brought together in combination step 116. The result of this combination yields an improved estimate of the wavelet and radiation pattern which can then be used in techniques, known by those skilled in the art, to generate seismic profiles of an area being explored.

FIG. 11 illustrates an alternative embodiment. In this technique, recently acquired source data is incorporated with previously recorded seismic data to generate a better estimate of the source wavelet to be used in generating an improved seismic profile. An advantage of this technique is that, so long as an identical source array is used, the second data set can be acquired in any region or location. Path 150 represents the previously recorded seismic data while path 152 represents newly acquired source data using the identical source array as in 154 in either the same or different region associated with path 150.

The initial four steps of path 150 are similar to the initial four steps described with respect to FIG. 10. In step 154, a source is activated to generate a source wavelet. A pulse comprised of an incident and reflected source wavelet is detected in step 156 and in step 158 that detected pulse is converted to a digital signal and recorded, in step 160, to tape or equivalent means.

This previously recorded data can be enhanced using the technique of this invention by taking a reading of the source wavelet using a detector positioned at a level below the position of the detector used in step 156 and identical to the array used in step 156. Following path 152, in step 164 a seismic pulse is detected at a position below the source and vertically off-set from the original receiver array. The detected pulses are converted in step 166 to digital signals which are then recorded to tape in step 168. The two tapes resulting from recording steps 160 and 168 are combined in processor 170 in step 172. The combined data on tapes 160 and 168 are corrected in step 174. In step 176 the data is processed to extrapolate the wave field in different directions and in step 178 the wave field is extrapolated in a single direction to give several estimates at the same angle. In step 180, the results of the two calculations are combined to provide an improved wavelet estimation.

Figure 12:
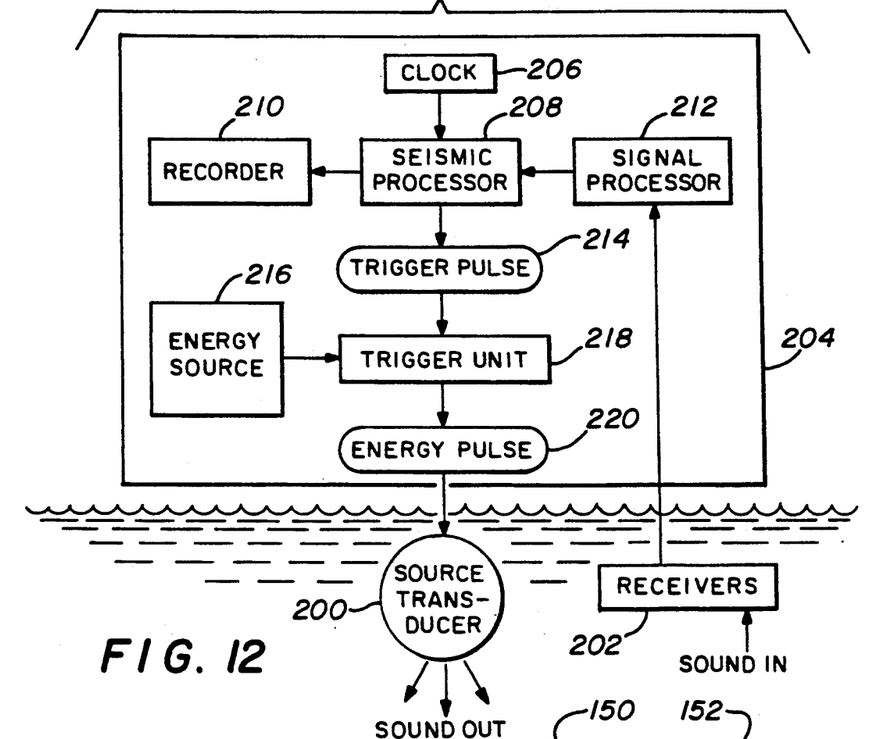
FIG. 12 schematically depicts the main components of a marine seismic system for use with invention.

Referring to FIG. 12, by way of background, a marine seismic prospecting system is schematically represented. The seismic data in a marine environment is acquired using a system comprised of essentially three components input source 200, a detector 202 and a recording system 204. Source transducer 200, which in practice would be an array comprised of a plurality of individual sources, and receiver 202, which also in practice would be comprised of a plurality of hydrophones, are located in the water while the equipment of recording system 204 would typically be located onboard a ship. The ship would trail source transducer 200 and receiver 202. In one embodiment of the invention receiver 202 is comprised of two sets of vertically offset detectors wherein one set of detectors is located no higher than the source transducer. In another embodiment one receiver is anchored to the floor of the ocean and source transducer 200 is moved by the ship across the receiver. In yet another embodiment, receiver 202 is comprised of two different types of detectors, such as pressure sensing and particle velocity measuring.

Recording system 204 comprises a clock 206 for synchronizing the various components of the system. Seismic processor 208 receives synchronizing pulses from clock 206 and input signals from signal processor 212. Seismic processor 208 outputs a trigger pulse 214 to trigger unit 218 and records digital data to recorder 210. Trigger unit 218 has associated energy source 216 for generating an energy pulse 220 in response to a trigger pulse 214 received from seismic processor 208. The energy pulse 220 is conveyed to source transducer 202, which can be a conventional airgun or equivalent, for generating a source wavelet such as those depicted in FIG. 2. Receivers 202, which in one embodiment is a pair of vertically offset receivers comprised of hydrophones, receives a pulse comprised of incident and reflected source waves and transmits the electrical representation of that pulse to signal processor 212. Signal processor 212 converts the electrical representation of the pulse to a digital signal and transmits that signal to seismic processor 208 for recording on recorder 210.

Figure 13:
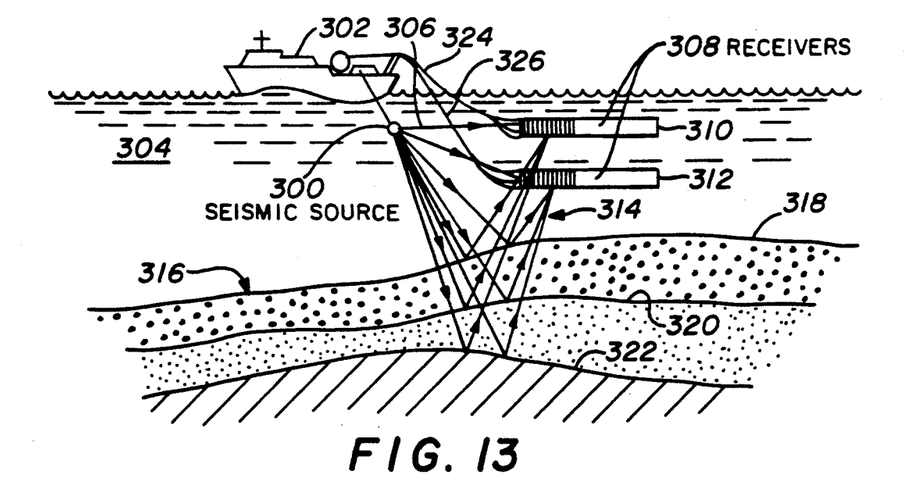
FIG. 13 shows the main components of a marine seismic prospecting system for practicing the invention.

Referring now to FIG. 13, seismic source 300 is dragged by ship 302 through the marine environment 304 while generating incident waves 306. Receivers 308 comprised of at least two sets of receivers 310 and 312 are deployed at or below the seismic source 300. Receiver array 312 is vertically offset from receiver array 310.

Receivers 308 detect a pulse transmitted through marine environment 304 comprised of incident waves 306 and reflected waves 314. The reflected waves bounce off the various interfaces of the target zone 316. As shown, there are three interfaces comprised of surface 318 which is the sea bed floor, and interfaces 320 and 322 which are the boundaries between different earth layers. The pulses detected by receiver 308 are then conveyed along cables 324 and 326 to ship 302 where they are recorded using a seismic recording apparatus such as that depicted in FIG. 12.

Figure 14A:
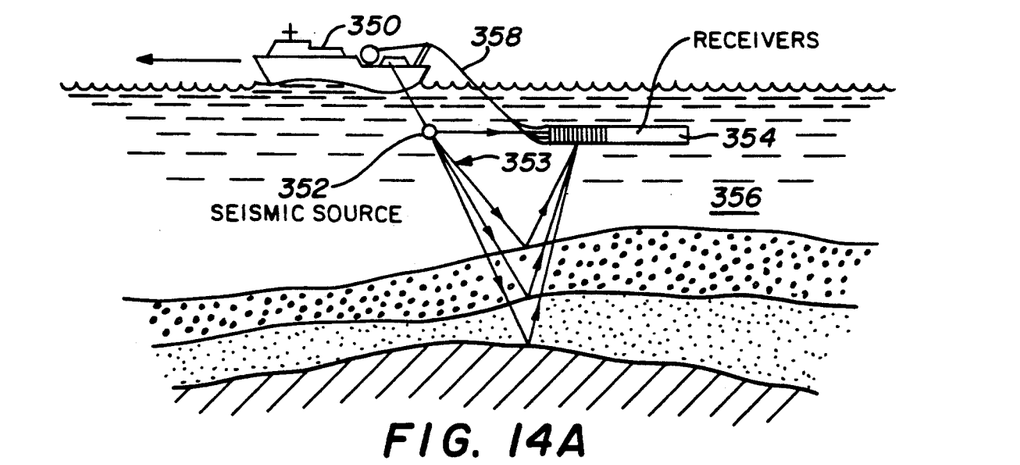
FIGS. 14A and 14B show an alternative embodiment of a seismic system employed in a marine environment.
Figure 14B:
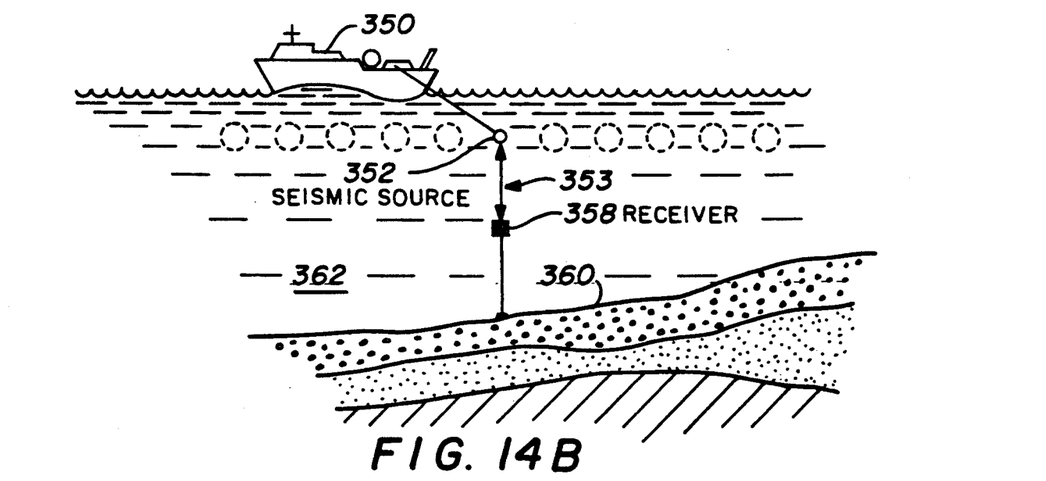

A difficulty with the system of FIG. 13 is in maintaining the receivers 310 and 312 at a constant vertical distance. This difficulty is overcome with the technique described in FIG. 14A and 14B representing separate passes over the same or different areas. The first pass, depicted in FIG. 14A, ship 350 trailing seismic source 352 and receivers 354, conducts a seismic profile over a region 356. The data collected by receivers 354 are transmitted to ship 350 along cable 358 and recorded on a seismic recording device as is well known by those skilled in the art.

In a second pass depicted by FIG. 14B, the same seismic source 352 is conveyed along region 362, which can be a sub-region of region 352 or an entirely different region emitting source waves 353. Receiver 358 anchored to sea floor 360 records the sequential source wavelets generated by seismic source 352 as it is conveyed along region 362. After ship 350 makes one pass over receiver 358, sufficient data will have been collected that a source wavelet and radiation pattern estimation can be performed using the techniques described in association with FIG. 11.

Figure 15:
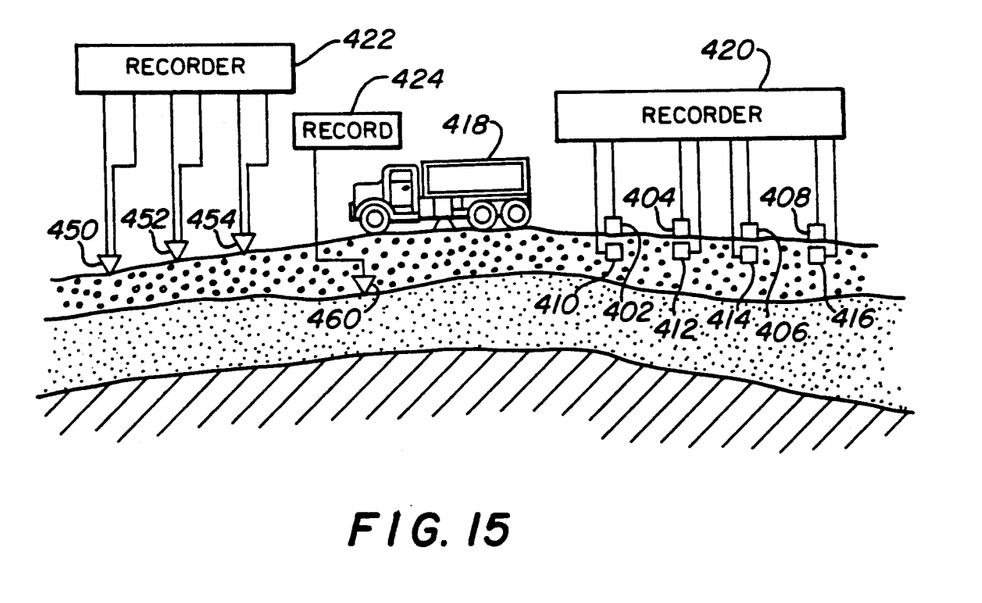
FIG. 15 shows another embodiment of the invention carried out in a terrestrial environment.

Referring now to FIG. 15, geophones 402 through 408 are surface mounted while geophones 410 through 416 buried directly beneath geophones 402 through 408. Vibrator truck 418 generates seismic pulses which are detected by geophones 402 through 416. (Alternatively, all the geophones can be buried.) Signals representative of the detected pulses are stored on recorder 420. The stored signals can then be processed in accord with the aforementioned techniques, described in connection with FIG. 10, to generate an accurate estimate of the source wavelet produced by vibrator truck 418.

In an alternative embodiment, receivers 450 through 454 each represent two detectors. One detector measures particle velocity and the other measures change in surface pressure. Signals generated by each of the detectors for all receivers are stored on recorder 422 for subsequent processing in accord with the previously described techniques.

In another embodiment, single receiver 460 is vertically offset from receivers 450 through 454, which for this embodiment comprise only a single detector such as a particle velocity detector. Vibrator truck 418 is then passed over detector 460 generating seismic pulses at different locations. The pulses detected by receiver 460 are stored on recorder 424 for subsequent processing in accord with the aforementioned techniques described in connection with FIG. 11.

From the above description, it will be seen by those having skill in the art that under the present invention an improved method and apparatus for conducting seismic prospecting is provided wherein the seismic wavelet is recorded in at least two vertically offset positions and processed in a way that permits accurate determination of the source wavelet. Moreover, since the invention may be practiced with previously obtained seismic data, a low cost method is provided for improving the seismic record of previous fields. While the invention has been particularly shown and described with reference to the preferred embodiments, it will be understood by those skilled in the art that various other changes in form and detail may be made without departing from the spirit and scope of the invention.

What is claimed:

1. A method of operating a computer to determine a source signature from recorded signals related to detected changes in a medium in response to an input from a seismic source, comprising the steps of:

activating a seismic source to generate a source wavelet in a medium;

detecting changes associated with said source wavelet in said medium at two vertically offset positions;

converting said detected changes in said medium to signals related to said detected changes;

storing, in computer readable form, data corresponding to said signals;

processing said stored data to generate a plurality of wavelet estimations by performing extrapolations for a plurality of distances from said source in the same direction; and statistically combining said plurality of wavelet estimations to determine said source signature.

2. The method of claim 1 further comprising making aperture corrections to said stored data prior to said processing step.

3. The method of claim 2 wherein said medium is a marine environment.

4. The method of claim 2 wherein said medium is a terrestrial environment.

5. The method of claim 1 wherein said source wavelet is a compression wave.

6. The method of claim 1 wherein said seismic source is vertically located at or above a position where said changes in said medium are detected.

7. The method of claim 6 wherein said changes in said medium are detected in at least two vertical positions.

8. The method of claim 7 wherein said source wavelet is generated in a marine environment.

9. The method of claim 6 wherein said seismic source is a plurality of wave generators configured in an array.

10. The method of claim 6 further comprising, prior to said processing step, the step of making aperture corrections.

11. The method of claim 1 wherein said changes in said medium are detected in two or more positions vertically offset from one another and at or below a position where said source wavelet is generated.

12. The method of claim 11 wherein said source wavelet is generated in a terrestrial environment.

13. The method of claim 1 wherein said source wavelet is generated in a marine environment.

14. The method of claim 1 wherein said source wavelet is generated in a terrestrial environment.

15. The method of claim 1 wherein said processing step is conducted remotely from said detecting step.

16. The method of claim 1, further comprising:
processing said stored data to generate a radiation pattern by performing a plurality of extrapolations in a plurality of directions to generate a radiation pattern.

17. The method of claim 16, wherein said combining step also combines said radiation pattern with said plurality of wavelet estimations to determine said source signature.

18. A system for conducting seismic prospecting comprising:
a source for generating waves;
a receiver for detecting incident and reflected waves and transmitting a signal representative of said detected waves;
a recorder for receiving and storing said transmitted signals; and
a processor for operating on said stored signals to generate wavelet estimating by performing extrapolations for a plurality of distances from said source in the same direction and for statistically combining said wavelet estimations to determine said source signature.

19. The system of claim 18 wherein said processor further makes aperture corrections to said stored signals.

20. The system of claim 18 wherein said source comprises a plurality of compressional wave generating devices configured in an array.

21. The system of claim 18 wherein said receiver is positioned at or below said source.

22. The system of claim 21, wherein said system includes a plurality of receivers;
and wherein said plurality of receivers are configured in two separate arrays vertically offset from one another.

23. The system of claim 18 wherein said receiver comprises a hydrophone.

24. The system of claim 18 wherein said receiver comprises a geophone.

25. The system of claim 18 wherein said processor is remotely located from said recorder.

26. The system of claim 18, wherein said processor is also for operating on said stored signals to generate a radiation pattern by performing extrapolations in a plurality of directions.

27. The system of claim 26, wherein said processor uses said radiation pattern in combination with said wavelength estimation to determine said source signature.

28. A system for conducting seismic profiling comprising:
a seismic source for generating source waves toward a subterranean target;
a plurality of receivers for detecting source waves and reflections of said source waves off of said subterranean target, and for transmitting a signal representative of said detected wave and reflections, said signals indicative of a wave field and a gradient of said wave field;
a recorder for receiving and storing said transmitted signals; and
a processor for operating on said stored signals to generate a source signature by solving for said source signature from an expression derived by equating a first integral expression for the wave field derived according to the Lippman-Schwinger equation, and a second integral expression for the wave field derived according to Green's second identity, and using said wave field and said gradient of said wave field indicated by said signals from said receivers.

29. The system of claim 28 wherein said processor is for operating on said stored signals to generate the source signature also by extrapolating, a plurality of times, a wavelet estimation where each extrapolation is performed in a different direction from said source.

30. The system of claim 28 wherein said processor is for operating on said stored signals to generate the source signature also by extrapolating, a plurality of times, a wavelet estimation where each extrapolation is performed at a different distance in the same direction from said source.

31. The system of claim 28 wherein said source is a plurality of compressional wave generating devices configured in a predetermined array.

32. The system of claim 28 wherein said plurality of receivers are vertically offset from one another.

33. The system of claim 28 wherein said processor is remotely located from said recorder.

34. The system of claim 28, wherein said source comprises a plurality of seismic sources configured in an array for generating an incident wave source;
and wherein said plurality of receivers are deployed at or below said seismic source array in such a manner that one of receivers is vertically offset from another of said receivers, each of said receivers comprising a transducer for detecting a hydrostatic pressure pulse and generating a signal corresponding to said pressure pulse, and a transmitter for transmitting said signal.

35. The system of claim 28, wherein said stored signals correspond to direct field and scattered field vibrations.

36. The system of claim 35, wherein said processor uses said wave field and said gradient of said wave field in such a manner that the effect of the data corresponding to the scattered field vibrations on the source signature is minimized.

37. The system of claim 28, wherein said plurality of receivers are for detecting waves and reflections at a plurality of depths relative to said seismic source; and wherein:

said stored signals corresponding to the gradient of said wave field are calculated by said processor from a comparison of the waves and reflections detected by said plurality of receivers.

38. The system of claim 37, wherein said plurality of receivers comprise a first receiver at a first depth relative to said source and a second receiver at a second depth relative to said source.

39. The system of claim 28, wherein said plurality of receivers comprise a first detector for detecting particle velocity, and a second detector for detecting change in pressure with a second detector.

40. The system of claim 39, wherein said first and second detectors are at the same depth relative to said seismic source.

41. A method of operating a computer to determine the source signature generated in a medium by a seismic source, said method comprising the steps of:
   energizing a seismic source;
   detecting vibrations in said medium resulting from said energizing;
   storing data corresponding to said detected vibrations generated by said source and detected at locations remote therefrom;
   retrieving, from said stored data, data corresponding to the wave field of said detected vibrations;
   retrieving, from said stored data, data corresponding to the gradient of the wave field of said detected vibrations;
   combining said retrieved data corresponding to the wave field of said detected vibrations and the gradient of the wave field of said detected vibrations into an expression derived from equating a first integral expression for the wave field derived according to the Lippman-Schwinger equation, and a second integral expression for the wave field derived according to Green's second identity, and solving for said source signature.

42. The method of claim 41, wherein said stored data corresponds to direct field and scattered field vibrations;
   and wherein said combining step is performed in such a manner that the effect of the data corresponding to the scattered field vibrations on the source signature is minimized.

43. The method of claim 41, further comprising:
   after said combining step, extrapolating said source signature for a plurality of distances in the same direction from said source.

44. The method of claim 41, further comprising:
   after said combining step, extrapolating said source signature in a plurality of directions from said source.

45. The method of claim 41, wherein said detecting step detects vibrations at a plurality of depths relative to said seismic source; and further comprising:
   generating from data corresponding to the gradient of said wave field from a comparison of the vibrations detected at said plurality of depths.

46. The method of claim 45, wherein said detecting step comprises:
   placing a plurality of detectors at a first depth relative to said seismic source; and
   placing a plurality of detectors at a second depth relative to said seismic source.

47. The method of claim 45, wherein said detecting step comprises:
   placing a detector in said medium;
   energizing said seismic source at a first depth relative to said detector; and
   energizing said seismic source at a second depth relative to said detector.

48. The method of claim 41, wherein said detecting step comprises:
   detecting particle velocity with a first detector; and
   detecting change in pressure with a second detector.

49. The method of claim 48, wherein said first and second detectors are at the same depth relative to said seismic source.

50. The method of claim 41, wherein said medium comprises water.

51. The method of claim 41, wherein said medium comprises earth.

* * * * *